us011310192B1

United States Patent
Sarra et al.

(10) Patent No.: US 11,310,192 B1
(45) Date of Patent: Apr. 19, 2022

(54) SYSTEMS AND METHODS FOR SECOND PROTOCOL COMMUNICATION OVER LDAP

(71) Applicant: Stealthbits Technologies LLC, Hawthorne, NJ (US)

(72) Inventors: Anthony Nicholas Sarra, Herriman, UT (US); Alexander Ivash, Minsk (BY); Alexei Belous, Minsk (BY); Pavel Shmakov, Moscow (RU)

(73) Assignee: Stealthbits Technologies LLC, Hawthorne, NJ (US)

( * ) Notice: Subject to any disclaimer, the term of this patent is extended or adjusted under 35 U.S.C. 154(b) by 81 days.

(21) Appl. No.: 16/722,388

(22) Filed: Dec. 20, 2019

(51) Int. Cl.
*H04L 29/12* (2006.01)
*H04L 29/06* (2006.01)
*G06F 16/28* (2019.01)
*H04L 61/4523* (2022.01)
*H04L 61/4552* (2022.01)

(52) U.S. Cl.
CPC ........ *H04L 61/1523* (2013.01); *G06F 16/282* (2019.01); *G06F 16/289* (2019.01); *H04L 61/1552* (2013.01); *H04L 63/083* (2013.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 6,708,170 | B1* | 3/2004 | Byrne | H04L 61/1523 |
| 2006/0168255 | A1* | 7/2006 | Katz | H04L 63/1416 709/229 |
| 2012/0240184 | A1* | 9/2012 | Thirasuttakorn | H04L 63/10 726/1 |
| 2015/0188949 | A1* | 7/2015 | Mahaffey | H04W 12/37 726/1 |
| 2018/0083915 | A1* | 3/2018 | Medam | H04L 29/12018 |
| 2018/0083944 | A1* | 3/2018 | Vats | H04L 63/08 |

* cited by examiner

*Primary Examiner* — Mohamed Ibrahim
(74) *Attorney, Agent, or Firm* — Austin Rapp (57) ABSTRACT

A monitoring device is described. The monitoring device includes a processor. The monitoring device also includes memory in electronic communication with the processor. The monitoring device further includes instructions stored in the memory. The instructions are executable to intercept a lightweight directory access protocol (LDAP) search request sent to an LDAP search handler of a security subsystem from a calling device. The LDAP search request includes a query string containing data for a second protocol. The instructions are also executable to generate response data for the second protocol to substitute for a response by the LDAP search handler. The instructions are further executable to send an LDAP search result to the calling device, the LDAP search result comprising the response data for the second protocol.

20 Claims, 7 Drawing Sheets

SYSTEMS AND METHODS FOR SECOND PROTOCOL COMMUNICATION OVER LDAP

TECHNICAL FIELD

The present disclosure relates generally to computers and computer-related technology. More specifically, the present disclosure relates to systems and methods for second protocol communication over lightweight directory access protocol (LDAP).

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small handheld computing devices to desktop computer systems to large multi-processor computer systems. In some configurations, multiple computers may communicate in a network environment. Network monitoring may be performed to secure network resources.

DETAILED DESCRIPTION

A monitoring device is described. The monitoring device includes a processor. The monitoring device also includes memory in electronic communication with the processor. The monitoring device further includes instructions stored in the memory. The instructions are executable to intercept a lightweight directory access protocol (LDAP) search request sent to an LDAP search handler of a security subsystem from a calling device. The LDAP search request includes a query string containing data for a second protocol. The instructions are also executable to generate response data for the second protocol to substitute for a response by the LDAP search handler. The instructions are further executable to send an LDAP search result to the calling device, the LDAP search result comprising the response data for the second protocol.

The query string may cause the LDAP search handler to generate an empty dataset or error response. The query string may be formatted with a valid LDAP search request format.

The query string may include a command for the monitoring device to perform an operation and a number of key value pairs to be used in the operation. The query string may include a filter to indicate that the LDAP search request is a modified LDAP search request.

The LDAP search result may include a number of attributes that include the response data.

The instructions may also executable to send the LDAP search request to the LDAP search handler to generate a first LDAP search result with an empty dataset or error response. The instructions may be further executable to substitute the empty dataset or error response of the first LDAP search result with the response data for the second protocol.

The monitoring device may include a domain controller configured with the LDAP search handler, a search interceptor to intercept the LDAP search request, and second protocol response generator to generate the response data.

In some examples, the LDAP search request may be sent for password validation. In other examples the LDAP search request may be sent for reporting workstation logins.

A method by a monitoring device is also described. The method includes intercepting a lightweight directory access protocol (LDAP) search request sent to LDAP search handler of a security subsystem. The LDAP search request includes a query string containing data for a second protocol. The method also includes generating response data for the second protocol to substitute for a response by the LDAP search handler. The method further includes sending an LDAP search result to the calling device, the LDAP search result comprising the response data for the second protocol.

A calling device is also described. The calling device includes a processor. The calling device also includes memory in electronic communication with the processor. The calling device further includes instructions stored in the memory. The instructions are executable to detect an event. The instructions are also executable to generate a lightweight directory access protocol (LDAP) search request with a query string containing data for a second protocol. The instructions are further executable to send the LDAP search request to a monitoring device. The instructions are additionally executable to receive an LDAP search result containing response data for the second protocol that substitutes for a response by the LDAP search handler.

The instructions may be further executable to perform an operation in response to the response data.

A method by a calling device is also described. The method includes detecting an event. The method also includes generating a lightweight directory access protocol (LDAP) search request with a query string containing data for a second protocol. The method further includes sending the LDAP search request to a monitoring device. The method additionally includes receiving an LDAP search result containing response data for the second protocol that substitutes for a response by the LDAP search handler.

Figure 1:
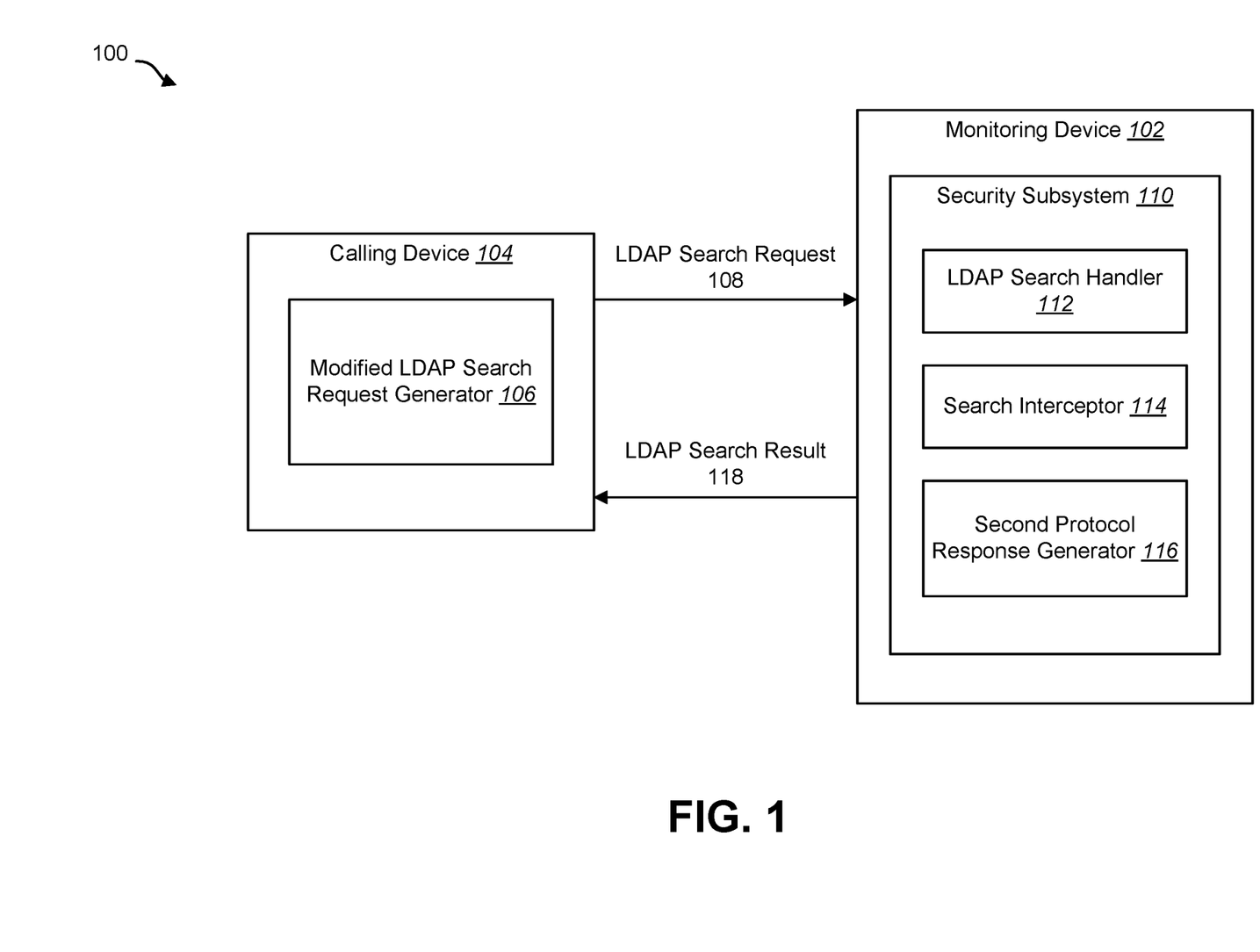
FIG. 1 is a block diagram illustrating one configuration of a network environment in which systems and methods for second protocol communication over lightweight directory access protocol (LDAP) may be implemented.

FIG. 1 is a block diagram illustrating one configuration of a network environment 100 in which systems and methods for second protocol communication over lightweight directory access protocol (LDAP) may be implemented. In particular, the systems and methods disclosed herein may allow for communication between a calling device 104 and a monitoring device 102 using a second protocol over LDAP.

A network environment 100 may include one or more monitoring devices 102 that are configured to perform monitoring operations. A monitoring device 102 may be a computing device (e.g., server) that is configured to communicate with other computing devices in the network environment 100.

In some configurations, the monitoring device 102 may be a server running ACTIVE DIRECTORY DOMAIN SERVICES (AD DS). This server may be referred to as an LDAP server or a domain controller. A domain controller may authenticate and authorize users and computers in a WINDOWS domain type network. The domain controller may assign and enforce security policies for computers in a WINDOWS domain network. For example, when a user logs into a computer that is part of a WINDOWS domain, ACTIVE DIRECTORY checks the submitted password and determines whether the user is a system administrator or a normal user. In another example, ACTIVE DIRECTORY may be used to update passwords and enforce password policies.

In some examples, ACTIVE DIRECTORY may use LDAP for communication with networked computing devices. LDAP is an application protocol for accessing and maintaining distributed directory information services over an Internet Protocol (IP) network. A computing device (e.g., calling device 104) may communicate with ACTIVE DIRECTORY using LDAP.

The monitoring device 102 may include a security subsystem 110. In some examples, the security subsystem 110 may be a Local Security Authority subsystem (LSASS). In the context of a WINDOWS operating system, the security subsystem 110 may be implemented as an lsass.exe process.

The security subsystem 110 may implement an LDAP search handler 112. One operation that may be performed in LDAP is an LDAP search. This operation may be used to search for and read entries in the LDAP server (e.g., ACTIVE DIRECTORY). In this case, a computing device may send an LDAP search request to the LDAP search handler 112. The LDAP search handler 112 may then return an LDAP search result in response to the LDAP search request. Therefore, the LDAP search handler 112 is configured to receive the LDAP search request. The LDAP search handler 112 may be used for communicating LDAP search queries from a remote computing device (e.g., calling device 104) to ACTIVE DIRECTORY. In normal operation, the LDAP search handler 112 may process the request and then return the LDAP search result.

In some cases, the calling device 104 may communicate data to the monitoring device 102. In some communication approaches, the calling device 104 and the monitoring device 102 may need to establish and maintain communication ports in order to communicate. Furthermore, communication between the calling device 104 and the monitoring device 102 may need to traverse one or more firewalls in the network environment 100. As seen by this discussion, configuring and maintaining separate communication channels may be difficult.

To facilitate communication between the calling device 104 and the monitoring device 102, the LDAP communication channel may be used to enable communication in a second protocol between the monitoring device 102 and a calling device 104. In this approach, the calling device 104 and the monitoring device 102 may leverage the existing communication channel used for LDAP communications to send and receive data that is configured for a second protocol. In some examples, the second protocol may be referred to as a remote procedure call (RPC). Therefore, in some implementations, the calling device 104 and monitoring device 102 may perform RPC over LDAP.

One or more calling devices 104 may communicate in the network environment 100. For example, the calling device 104 may be a computing device (e.g., workstation, desktop computer, laptop computer, tablet computer, smartphone, server, etc.) that is configured to communicate in the network environment 100. The calling device 104 may be located within a local network of a monitoring device 102 (e.g., local area network (LAN), wireless local area network (WLAN)) or the calling device 104 may attempt to access the network via a remote connection (e.g., remote desktop connection, Internet connection).

The calling device 104 may send a modified LDAP search request 108 to the LDAP search handler 112 on the monitoring device 102. For example, domain-connected devices may be configured to communicate with a domain controller (e.g., the monitoring device 102) for LDAP queries as part of the basic framework of ACTIVE DIRECTORY.

The calling device 104 may include a modified LDAP search request generator 106. The modified LDAP search request generator 106 may insert a query string containing data for a second protocol into the LDAP search request 108. For example, an operation (referred to herein as a second protocol operation) that is to be performed by the monitoring device 102 may use the second protocol. This second protocol operation may be separate from LDAP operations performed by the LDAP search handler 112. Therefore, the calling device 104 may include data in the LDAP search request 108 that is intended for an operation that is to be performed by the monitoring device 102 that is separate from an LDAP search handler 112 operation. This data may be formatted according to a second protocol used for the second protocol operation.

The query string that includes the second protocol data (e.g., commands, values, attributes, objects, etc.) may be formatted to be a valid LDAP message, but is meaningless to the LDAP search handler 112. In other words, the LDAP search request 108 may appear as a legal LDAP message, but the contents of the search string may be nonsensical to the LDAP search handler 112. Therefore, the LDAP search request 108 may cause the LDAP search handler 112 to return empty data set or an error message.

In some examples, the query string may include a command for the monitoring device 102 to perform an operation (e.g., the second protocol operation). The query string may also include a number of key value pairs to be used in the operation. The query string may further include a filter to indicate that the LDAP search request 108 is a modified LDAP search request. In an example, the beginning of the LDAP search filter may be analyzed and if a "*" is detected, then the hex string after "=" may be parsed and treated as the command buffer. An example of the modified LDAP search request 108 is described in connection with FIG. 4.

The monitoring device 102 may be configured to intercept LDAP traffic. For example, the monitoring device 102 may include a search interceptor 114. The search interceptor 114 may be a program that is installed on the monitoring device 102 that performs monitoring operations. As used herein, a monitoring operation may use the second protocol data communicated in the LDAP search request 108.

The search interceptor 114 may include hook code. The hook code may enable the search interceptor 114 to hook (i.e., intercept) the LDAP search handler 112. As used herein, the term hook or hooking refers to altering the behavior of the native operating system of the monitoring device 102 by intercepting a function call. In this case, the search interceptor 114 may use the hook code to intercept the native LDAP search handler 112 invocation by the LDAP search request 108. Therefore, the search interceptor 114 may monitor for LDAP search requests 108 sent to the LDAP search handler 112. The search interceptor 114 may intercept a LDAP search request 108 before it reaches the LDAP search handler 112.

Upon receiving an LDAP search request 108, the search interceptor 114 may determine whether the LDAP search request 108 is modified with a query string containing data for the second protocol. For example, the query string may include a filter that is unique to communication using the second protocol. If the search interceptor 114 sees this unique filter, then the search interceptor 114 may begin to extract the contents of the query string. In an implementation, if the search interceptor 114 does not see the unique filter, then the search interceptor 114 may allow an LDAP search request 108 to pass to the LDAP search handler 112. In another implementation, the search interceptor 114 may allow an LDAP search request 108 to pass to the LDAP search handler 112 regardless of whether the unique filter is detected.

The search interceptor 114 may perform an operation using the data included in the query string. In some examples, the LDAP search request 108 may be sent for password validation. For instance, when a user is prompted to change a password, the calling device 104 may include the new password and username in a LDAP search request 108 along with a command to validate the password and a filter that flags the LDAP search request 108 as a modified LDAP search request. The search interceptor 114 may perform password validation using a set of rules and criteria that are separate from those of ACTIVE DIRECTORY.

In other examples, the LDAP search request 108 may be sent for reporting workstation logins. For example, when a user logs into a workstation (e.g., the calling device 104), the workstation may send a LDAP search request 108 that includes login information in the query string formatted according to the second protocol. Upon receiving the LDAP search request 108, the search interceptor 114 may extract and record the login information. The search interceptor 114 may then perform additional operations using the login information.

The search interceptor 114 may generate response data for the second protocol to substitute for a response by the LDAP search handler 112. For example, the search interceptor 114 may generate data in response to the command included in the LDAP search request 108. The response data may be used to replace (i.e., substitute) data that would be generated natively by the LDAP search handler 112. Because the query string is formatted for the second protocol, the LDAP search handler 112 would return an empty dataset or error message. Therefore, the response data may replace this empty dataset or error message with meaningful data for the second protocol operation. The LDAP filter used as the container for the second protocol has the correct LDAP syntax (otherwise the client LDAP API would not even allow such a request to be sent). Therefore, the search interceptor 114 may pass the second protocol parameters to the LDAP search handler 112, which executes the LDAP search request 108 but produces no data as the result.

The monitoring device 102 may send an LDAP search result 118 to the calling device 104. In an example, the search interceptor 114 may include a second protocol response generator 116. The second protocol response generator 116 may generate response data for the second protocol that is to be communicated to the calling device 104 in an LDAP search result 118. For example, the LDAP search result 118 may include an object and a number of attributes that include the response data. An example of the modified LDAP search result 118 is described in connection with FIG. 5.

In an example, the LDAP search result 118 may include a directory object. This object may include at least one attribute to communicate information in the second protocol. In an example, the LDAP search result 118 may include a first attribute to indicate the presence of the search interceptor 114. Upon receipt of a LDAP search result 118 with at least one attribute, the calling device 104 may know that the search interceptor 114 is present and monitoring for the modified LDAP search request 108. If the search interceptor 114 is not present, then the LDAP search handler 112 will return an LDAP search result 118 with an empty value. The calling device 104 may interpret this empty value response as the search interceptor 114 is not present.

The LDAP search result 118 may include a second attribute. The second attribute may include one or multiple values. These values may be generated in response to the second protocol operation performed by the search interceptor 114.

In one approach, the search interceptor 114 may generate and send the LDAP search result 118 to the calling device 104 without invoking the LDAP search handler 112. In this approach, the search interceptor 114 prepares the LDAP search result 118 and populates the LDAP search result 118 with the response data without the LDAP search handler 112.

In another approach, the search interceptor 114 may send the LDAP search request 108 to the LDAP search handler 112 to generate a first LDAP search result with an empty dataset or error response. The second protocol response generator 116 may then substitute the empty dataset or error response of the first LDAP search result with the response data for the second protocol. The second protocol response generator 116 may then send the modified LDAP search result 118 to the calling device 104. In this approach, the second protocol response generator 116 may allow the LDAP search handler 112 to allocate memory and prepare buffers for the LDAP search result 118. The second protocol response generator 116 then overwrites some of the data in these buffers with the response data. In other words, the second protocol response generator 116 may substitute the empty attributes array of the LDAP search handler 112 with an attributes array containing the response data for the second protocol. This approach may simplify the work that is performed by the search interceptor 114 by leveraging the native behavior of the LDAP search handler 112 and substituting the response data.

Upon receipt of the LDAP search result 118, the calling device 104 may perform an operation based on the response data. For example, the calling device 104 may display the values included in the response data. In the case of password validity, the calling device 104 may display the reasons why the password is invalid. In the case of user login monitoring, the calling device 104 may display reasons why a user login failed.

It should be noted that both the modified LDAP search request 108 and the modified LDAP search result 118 appear as legitimate LDAP traffic for intervening systems. Therefore, communication between the calling device 104 and the monitoring device 102 for the second protocol may be performed without having to establish and maintain a separate communication channel.

The systems and methods described herein provide for a large number of end nodes (e.g., calling devices 104) to communicate data to a search interceptor 114 located on the monitoring device 102 without having to establish and maintain a separate communication channel. In an example, a possible new password value may be tested against rules for what would be a valid password before a user is allowed to change the password. In another example, systems and methods described herein may prevent performance problems by keeping multiple workstations from inundating a single-instance password server at the same time. Also, in a multi-domain environment, a password server might not be reachable from all end nodes unless special additional configuration steps are taken. However, the search interceptor 114 may be present on every domain controller. The search interceptor 114 may hook (i.e., intercept) all LDAP search query traffic via hook code injected into the security subsystem 110 (e.g., the local security authority subsystem service (LSASS) process) when the monitoring device 102 boots up.

In an example, a logon extension dynamic link library (DLL) may be deployed to the calling device 104. This logon extension DLL may be a logon install script or other one-time deployment mechanism. This DLL may monitor and respond to events on the calling device 104. For example, in the case of password validation, the DLL may obtain the user-entered password value during a password change operation, such as during login when the operating system prompts the user for a new password due to the current password being expired. Instead of the DLL making a local decision on whether the new password is valid, the DLL may craft an LDAP search request 108 with a query string for the second protocol as described above. The search interceptor 114 may see this special query string and when it does, instead of passing it on to the LDAP search handler 112 to evaluate as normal, the search interceptor 114 instead performs the second protocol operation (e.g., a password rule test, login monitoring, etc.) based on the command included in the query string. The second protocol response generator 116 then crafts an LDAP search result 118. In the case of password validation, the LDAP search result 118 contains either a message that the proposed password is valid or reasons the password is not valid (e.g., which rule(s) the password violates).

It should be noted that the DLL is not a separate agent. Therefore, the calling device 104 may be configured to communicate with the monitoring device 102 in an agentless mode. Because the calling device 104 is agentless, this may simplify deployment in a large organization with multiple workstations.

Some advantages of the systems and methods described herein include not having to create and deploy a special password validation server or web service to validate passwords. By leveraging LDAP, data encryption may be natively performed using any one of several secure LDAP transports, such as a signed and/or sealed transport. Furthermore, scalability and redundancy (e.g., high availability) are provided because ACTIVE DIRECTORY is highly scalable and fault tolerant by having multiple domain controllers with full replication. Additionally, an organization does not have to deploy one or multiple password validation servers to be scalable and fault tolerant, manage them or ensure they are reachable from all end nodes (i.e. configure firewalls, routers, etc.)

In the case of the calling device 104, the deployed DLL does not require site-specific configuration information to find the monitoring device 102. All domain-connected machines already know how to talk to a domain controller for LDAP queries, which is part of the basic framework of ACTIVE DIRECTORY.

It should be noted that while functions are described in terms of particular modules herein, additional or alternative modules and/or a combination of modules or a sub-part of a module may perform one or more of the functions described herein.

Figure 2:
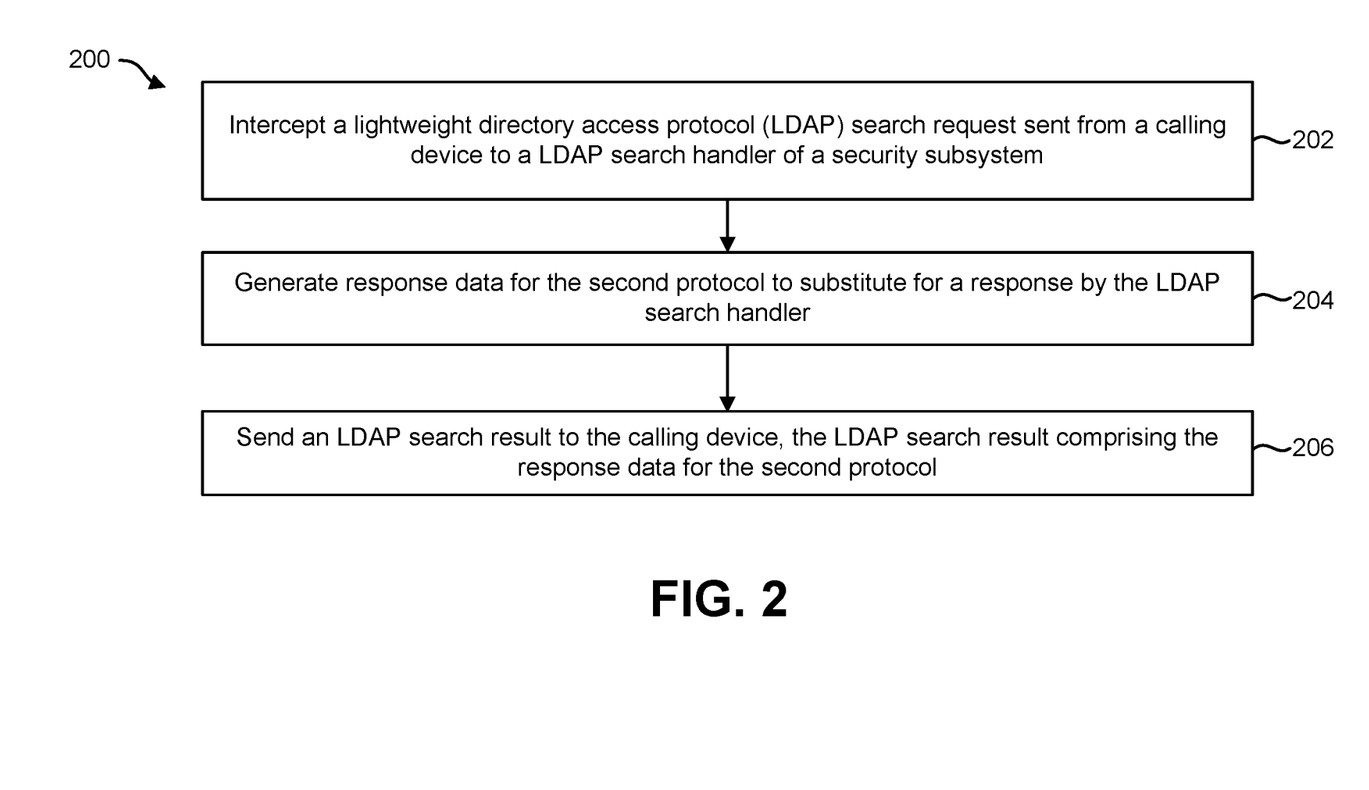
FIG. 2 is a flow diagram illustrating one configuration of a method for second protocol communication over LDAP.

FIG. 2 is a flow diagram illustrating one configuration of a method 200 for second protocol communication over LDAP. The method 200 may be implemented by a monitoring device 102 in a network environment 100. In an implementation, the monitoring device 102 may be a domain controller configured with an LDAP search handler 112 and an search interceptor 114.

The monitoring device 102 may intercept 202 a LDAP search request 108 sent from a calling device 104 to an LDAP search handler 112 of a security subsystem 110. The LDAP search request 108 may include a query string containing data for a second protocol. The search interceptor 114 may intercept 202 the LDAP search request 108 using hook code.

The query string may be formatted with a valid LDAP search request format. However, the query string may cause the LDAP search handler 112 to generate an empty dataset or error response. In some examples, the second protocol may be referred to as a remote procedure call (RPC). An operation (referred to herein as a second protocol operation) that is to be performed by the monitoring device 102 may use the second protocol. This second protocol operation may be separate from LDAP operations performed by the LDAP search handler 112.

In some examples, the query string may include a command for the monitoring device 102 to perform an operation and a number of key value pairs to be used in the operation. The query string may also include a filter to indicate that the LDAP search request 108 is a modified LDAP search request.

The monitoring device 102 may generate 204 response data for the second protocol to substitute for a response by the LDAP search handler 112. For example, the monitoring device 102 may extract the data included in the query string that is formatted for the second protocol. The monitoring device 102 may then perform an operation indicated by the query string to generate response data for the second protocol. The monitoring device 102 may replace (i.e., substitute) data that would be generated natively by the LDAP search handler 112 with the response data.

The monitoring device 102 may send 206 an LDAP search result 118 to the calling device 104. The LDAP search result 118 may include the response data for the second protocol. In some examples, the LDAP search result 118 may include a number of attributes that include the response data.

Figure 3:
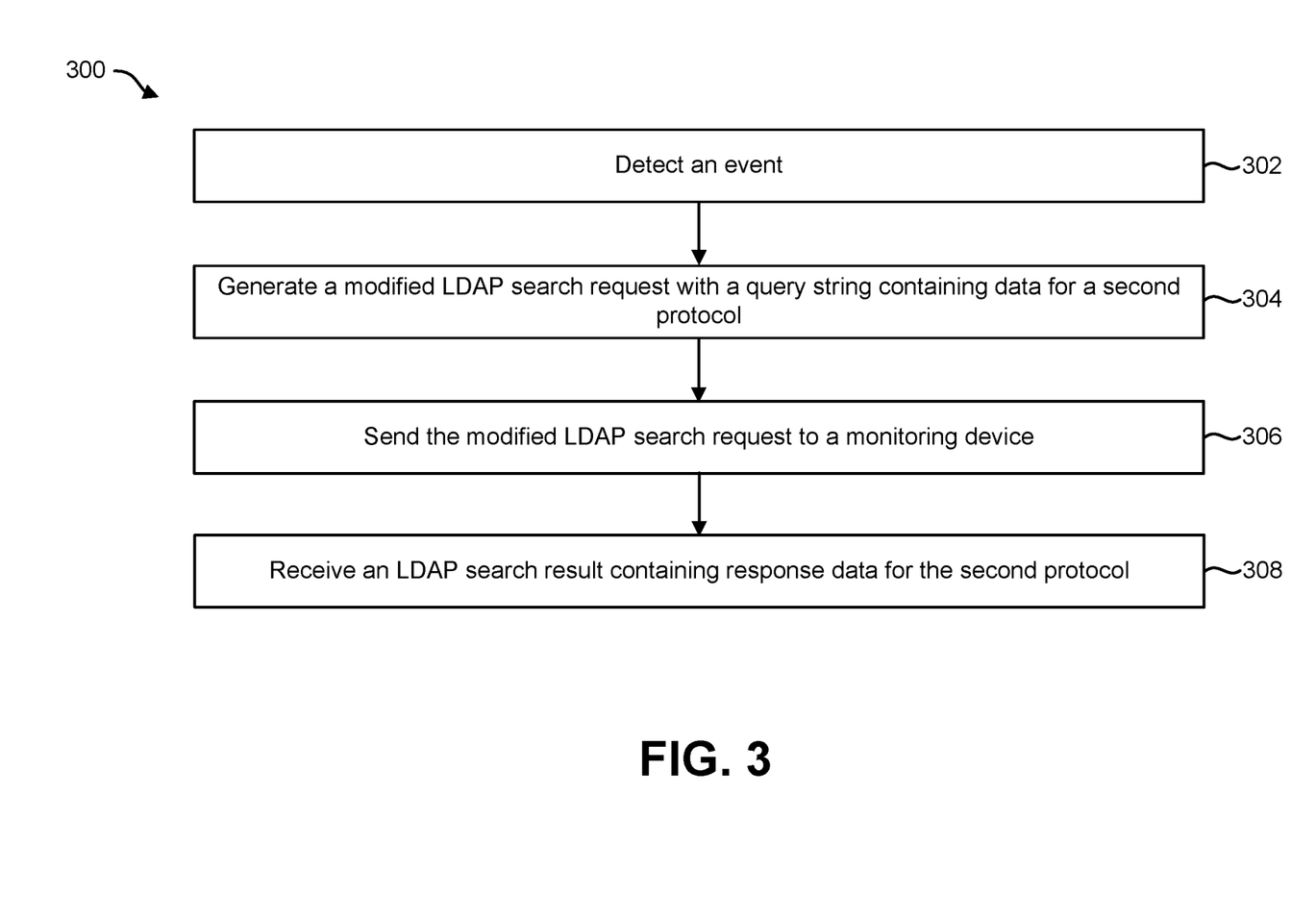
FIG. 3 is a flow diagram illustrating another configuration of a method for second protocol communication over LDAP.

FIG. 3 is a flow diagram illustrating another configuration of a method 300 for second protocol communication over LDAP. The method 300 may be implemented by a calling device 104.

The calling device 104 may detect 302 an event. For example, the calling device 104 may be configured with a DLL that monitors and responds to events. In some implementations, an event may include a password change. In other implementations, an event may include a user login.

The calling device 104 may generate 304 a modified LDAP search request 108 with a query string containing data for a second protocol. The data for the second protocol may be related to an operation that is to be performed by a monitoring device 102 in response to the detected event. The calling device 104 may insert a query string containing data for the second protocol into the LDAP search request 108.

The query string may be formatted with a valid LDAP search request format. However, the query string may cause the LDAP search handler 112 to generate an empty dataset or error response. In some examples, the query string may include a command for the monitoring device 102 to perform the operation and a number of key value pairs to be used in the operation. The query string may also include a filter to indicate that the LDAP search request 108 is a modified LDAP search request.

The calling device 104 may send 306 the modified LDAP search request 108 to a monitoring device 102. For example, the monitoring device 102 may be a domain controller. Because the calling device 104 is a domain-connected device, the calling device 104 knows how to communicate the LDAP search request 108 to the domain controller (e.g., the monitoring device 102) for LDAP queries.

The calling device 104 may receive 308 an LDAP search result 118 containing response data for the second protocol. For example, the monitoring device 102 may generate and send response data based on the query string included in the modified LDAP search request 108. The LDAP search result 118 may include the response data for the second protocol. In some examples, the LDAP search result 118 may include a number of attributes that include the response data. Upon receiving 308 the LDAP search result 118, the calling device 104 may perform an operation responsive to the response data.

Figure 4:
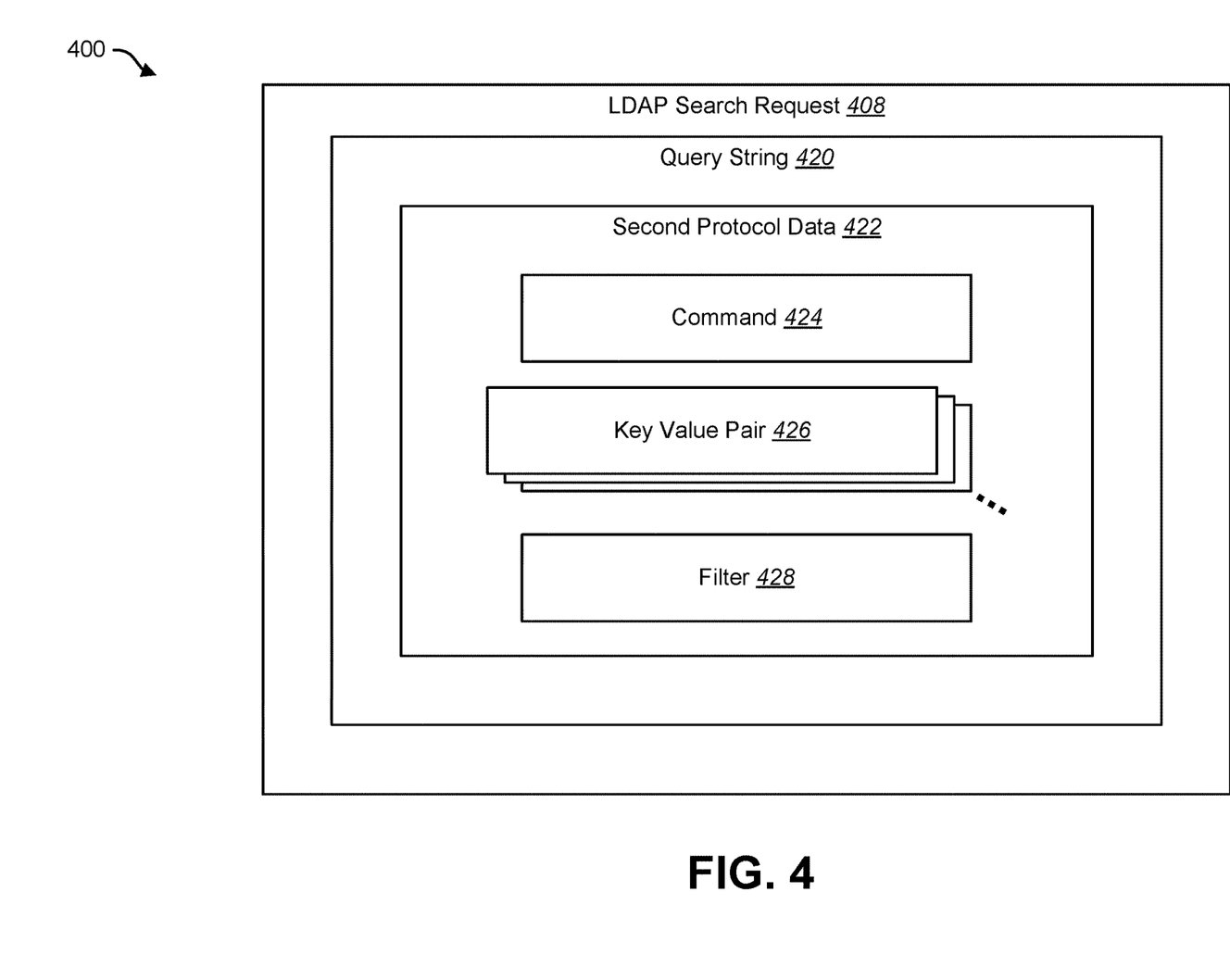
FIG. 4 is a block diagram illustrating an example of an LDAP search request.

FIG. 4 is a block diagram illustrating an example of an LDAP search request 408. As described in FIG. 1, the LDAP search request 408 may be generated by a calling device 104 in response to a detected event. The LDAP search request 408 may be a valid LDAP search request. However, the query string 420 may include data formatted for a second protocol (i.e., second protocol data 422).

In this example, the second protocol data 422 includes a command 424. The command 424 may indicate the type of operation that is to be performed by the monitoring device 102. For example, in the case of password validation, the command 424 may include "validate password" written in plain text.

The second protocol data 422 may also include a number of key value pairs 426 that are to be used in the operation performed by the monitoring device 102. For example, in the case of password validation, a first key pair 426 may be "password=password value," where password value is a new password entered by a user. A second key pair 426 may be "username=username," where username is the username of the user providing the new password.

The second protocol data 422 may also include a filter 428. The filter 428 may indicate to the monitoring device 102 that the LDAP search request 408 is a modified LDAP search request.

In some implementations, the second protocol data 422 may be passed as an LDAP search filter 428 that has the following format: *=% command buffer %. In this case, % command buffer % is a string of two-byte hex numbers. It should be noted that this format may vary depending on obfuscation and or encryption of the second protocol data 422.

In some implementations, the query string 420 may be imported into a hex stream before being transmitted to the monitoring device 102. Internally, the command buffer may be a number of Unicode strings separated by a 'new line' character. Each Unicode string may be a key-value pair separated by '='.

An example for how the second protocol data 422 may be expressed in the LDAP search filter 428 is:
=63006F006D006D0061006E0064003D00760061006-
C0069006400610 07400650050006100730073007-
7006F00720064000D000A007000610073 00730077-
006F00720064003D0073006F006D00650070006100-
73007300 77006F00720064000D000A007500730730-
0650072006E0061006D0065003 D0073006F006-
D0065007500730073007300650072000D000A00

In this example command buffer contains the following data: command=validatePassword; password=somepassword; username=someuser.

The first pair has the 'command' key inside. This key may be used to understand what the monitoring device 102 does with this data. For example, the command is 'validatePassword'. All other key-values are parameters.

Because the query string 420 is formatted to appear as a valid query for a LDAP search request 408, the LDAP API on the calling device 104 does not refuse to send the modified LDAP search request 408.

On the monitoring device 102 side, the monitoring device 102 may unpack the LDAP search request 408 into the command 424 first. The monitoring device 102 may then analyze the command (e.g., "validate password") to determine what operation is to be performed. The monitoring device 102 may then translate the LDAP search request 408 buffer to properly extract the key value pairs 426 (e.g., username and password).

Figure 5:
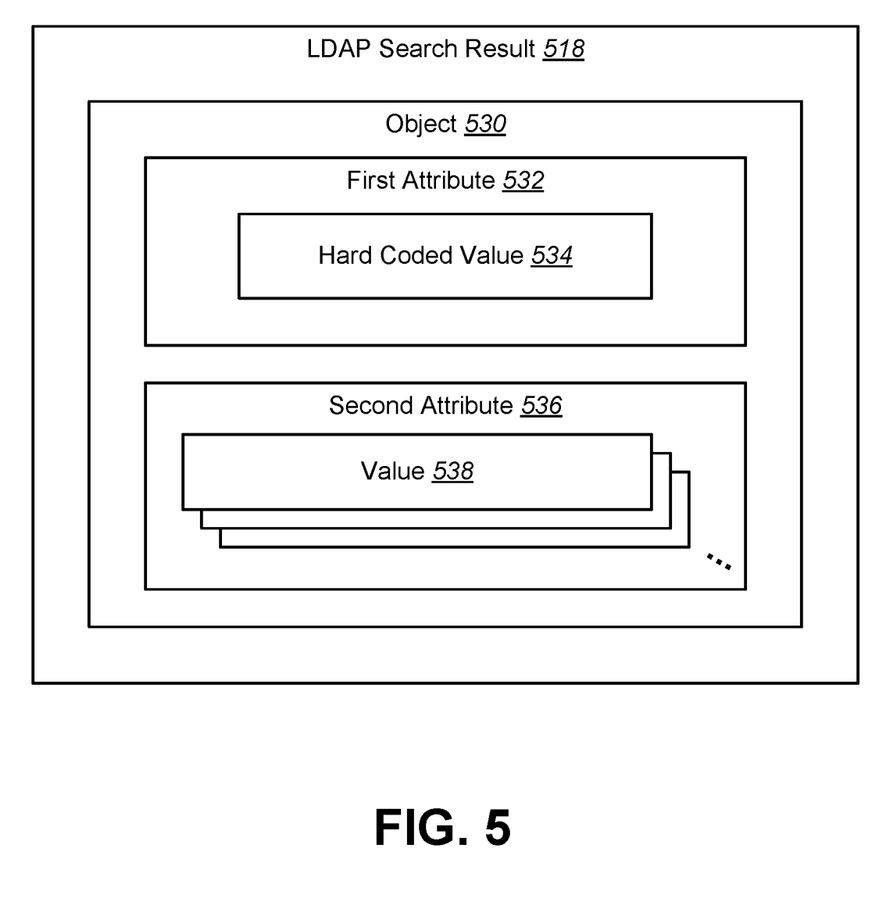
FIG. 5 is a block diagram illustrating an example of an LDAP search result.

FIG. 5 is a block diagram illustrating an example of an LDAP search result 518. As described in FIG. 1, the LDAP search result 518 may be generated by a monitoring device 102 in response to an LDAP search request 108 received from a calling device 104.

The LDAP search result 518 may include an object 530. In some examples, the object 530 may be a directory object. This object 530 may include a number of attributes 532 to communicate information in the second protocol.

In an example, the LDAP search result 518 may include a first attribute 532 to indicate the presence of the search interceptor 114 on the monitoring device 102. This first attribute may include a hard-coded value 534 (e.g., "AgentPresent").

A second attribute 536 may include one or multiple values 538. These values 538 may be generated in response to the second protocol operation performed by the search interceptor 114. For instance, in the case of password validation, the password may fail for five different reasons. The second attribute 536 may then include five values 538, one for each of the reasons why the password failed. In this manner, a detailed explanation for password failure may be communicated back to the calling device 104.

In some examples, the first attribute 532 may be string-based with a single-value string inside. The second attribute 536 may be string-based with multiple string values inside.

Figure 6:
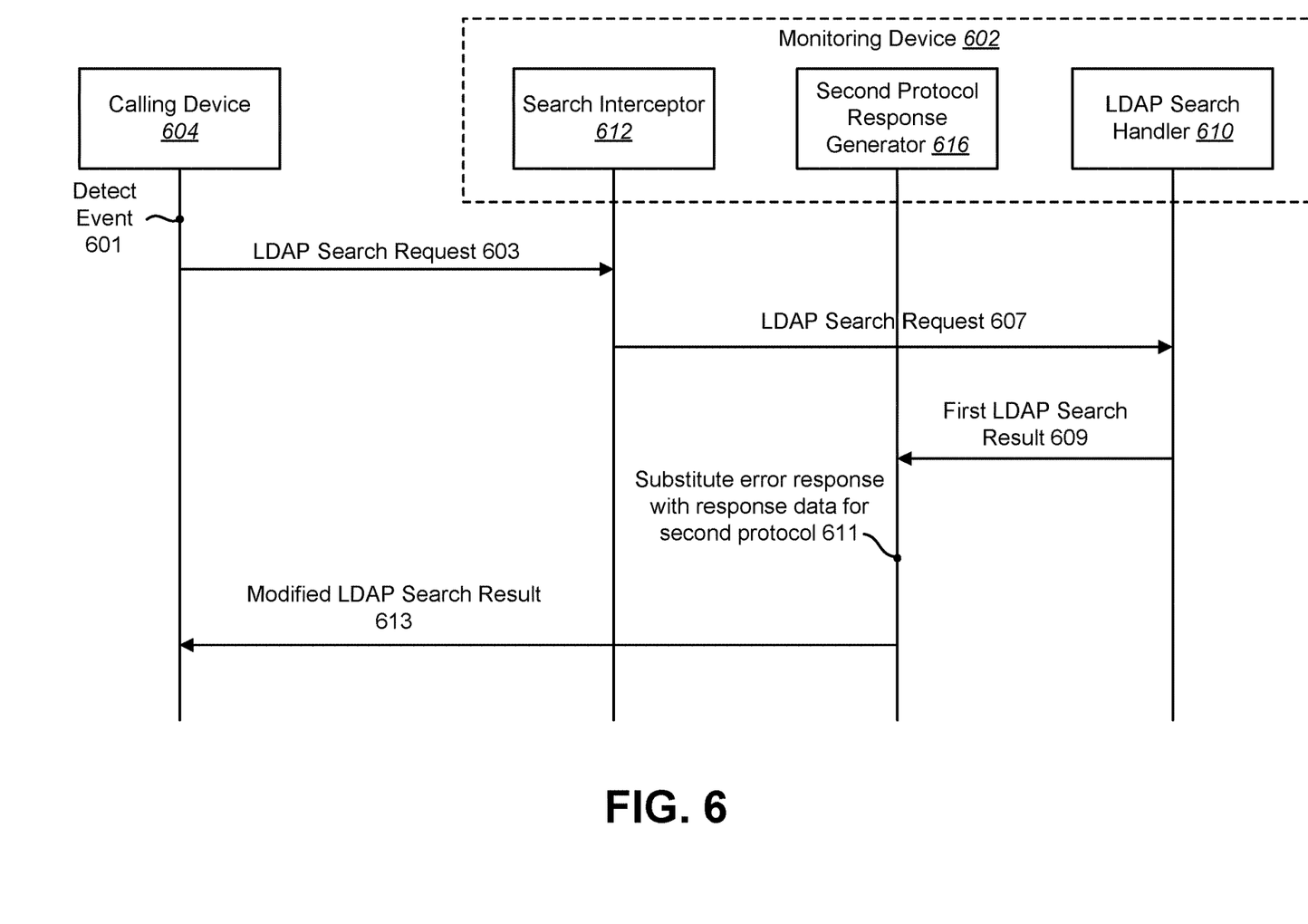
FIG. 6 is a sequence diagram illustrating an example of second protocol communication over LDAP.

FIG. 6 is a sequence diagram illustrating an example of second protocol communication over LDAP. A calling device 604 and a monitoring device 602 may be implemented in accordance with the calling device 104 and monitoring device 102 described in FIG. 1, respectively. The monitoring device 602 may implement a search interceptor 612 a second protocol response generator 616 and an LDAP search handler 610.

The calling device 604 may detect 601 an event. For example, a DLL on the calling device 604 may monitor and respond to events. In some implementations, the event may include a password change. In other implementations, the event may include a user login.

The calling device 604 may send 603 a LDAP search request 108 to the monitoring device 602. The LDAP search request 108 may include a query string containing data for a second protocol. The query string may include a command for an operation that is to be performed by the monitoring device 602 in response to the detected event.

The search interceptor 612 may intercept the LDAP search request 108. For example, the search interceptor 612 may intercept the LDAP search request 108 using hook code injected into the LSASS process of the monitoring device 602 when the monitoring device 602 boots up.

The search interceptor 612 may send 607 the LDAP search request 108 to the LDAP search handler 610. Upon receiving the LDAP search request 108, the LDAP search handler 610 may attempt to process the LDAP search request 108. In this case, because the query string contains data for a second protocol, which is not intended for the LDAP search handler 610, the LDAP search handler 610 may generate an empty dataset or error response.

The LDAP search handler 610 may send 609 a first LDAP search result that includes the empty dataset or error response. This first LDAP search result may be intercepted by the second protocol response generator 616. The second protocol response generator 616 may generate response data responsive to the LDAP search request 108. For example, the second protocol response generator 616 may perform the operation indicated by the LDAP search request 108. The second protocol response generator 616 may substitute 611 the first LDAP search result with the generated response data for the second protocol. The second protocol response generator 616 may send 613 the modified LDAP search result 118 to the calling device 604.

Figure 7:
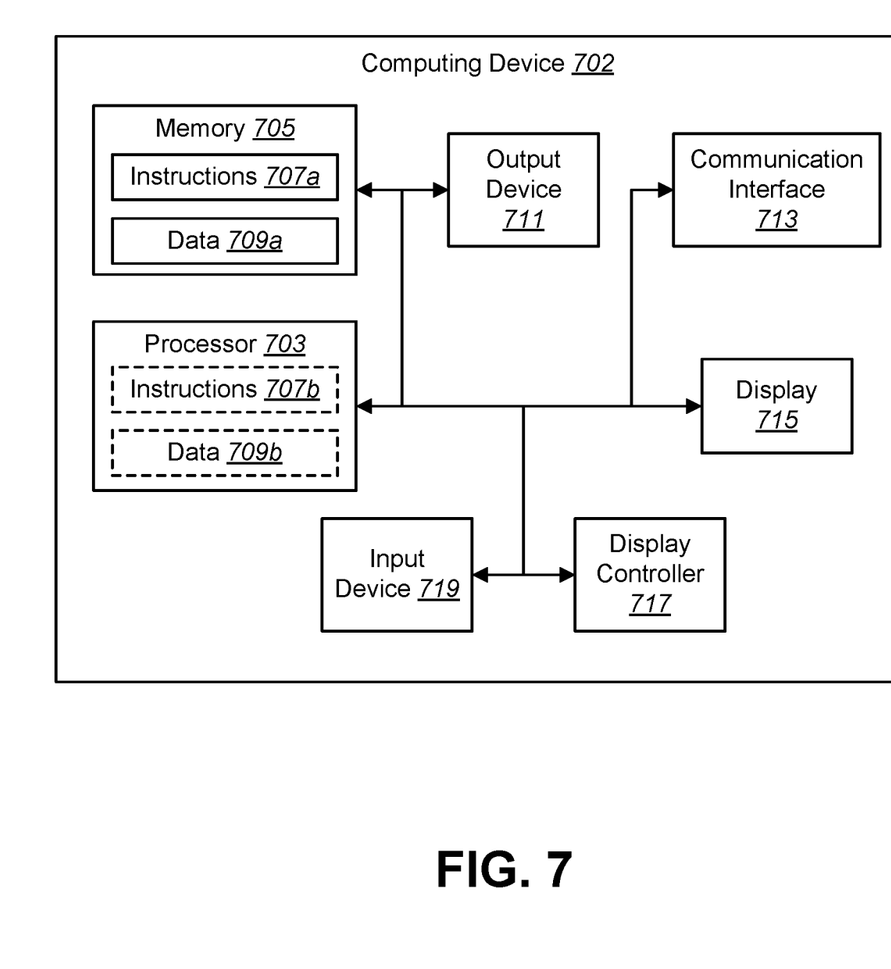
FIG. 7 is a block diagram illustrating components that may be utilized by a computing device.

FIG. 7 is a block diagram illustrating components that may be utilized by a computing device 702. The computing device 702 may be configured in accordance with one or more of the monitoring devices 102 or calling devices 104 described herein.

The computing device 702 may communicate with other electronic devices through one or more communication interfaces 713. Communication through the communication interface 713 may be achieved through different methods such as wired communication, wireless communication or both wired and wireless communication. For example, the communication interface 713 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 702 may receive and transmit information through one or more input devices 719 and one or more output devices 711. The input devices 719 may be a keyboard, mouse, microphone, remote control device, button, joystick, trackball, touchpad, lightpen, etc. The output devices 711 may be a speaker, printer, etc. A display device 715 is an output device that may be included in a computer system. Display devices 715 may project information through different technologies, such as liquid crystal display (LCD), light-emitting diode (LED), gas plasma, electroluminescence, a cathode ray tube (CRT) or the like.

A processor 703 controls the operation of the computing device 702 and may be a microprocessor, a microcontroller, a digital signal processor (DSP) or other device known in the art. A memory 705 may be included in the computing device 702 and includes instructions 707*a* and data 709*a* to assist the processor 703 in operating the computing device 702. The memory 705 may send program instructions 707*b* and/or data 709*b* to the processor 703 in order for the processor 703 to perform logical and arithmetic operations according to methods disclosed herein. The processor 703 may execute one or more of the instructions stored in the memory 705 to implement one or more of the systems and methods disclosed herein.

Data 709*a* stored in the memory 705 may be converted to text, graphics and/or moving images (as appropriate) by a display controller 717. Of course, FIG. 7 illustrates only one possible configuration of a computing device 702. Various other architectures and components may be utilized.

In an implementation, the computing device 702 may be a headless server. For example, the computing device 702 may be configured to provide services to other computing devices with or without peripheral input/output interfaces.

In another implementation, the computing device 702 may be configured to run on desktop and server hardware, both physical and virtual. In yet another implementation, the computing device 702 may be configured to run desktop and server MICROSOFT WINDOWS operating systems.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A monitoring device, comprising:
   a processor;
   a memory in electronic communication with the processor;
   instructions stored in the memory, the instructions being executable to:
   intercept a lightweight directory access protocol (LDAP) search request sent to an LDAP search handler of a security subsystem from a calling device, the LDAP search request comprising a query string containing data for a second protocol, wherein the LDAP search handler performs LDAP operations, wherein the query string is for a second protocol operation that is separate from the LDAP operations, and wherein the query string is meaningless to the LDAP search handler;
   generate response data for the second protocol to substitute for a response by the LDAP search handler; and
   send an LDAP search result to the calling device, the LDAP search result comprising the response data for the second protocol.

2. The monitoring device of claim 1, wherein the query string causes the LDAP search handler to generate an empty dataset or error response.

3. The monitoring device of claim 1, wherein the query string is formatted with a valid LDAP search request format.

4. The monitoring device of claim 1, wherein the query string comprises a command for the monitoring device to perform an operation and a number of key value pairs to be used in the operation.

5. The monitoring device of claim 1, wherein the query string comprises a filter to indicate that the LDAP search request is a modified LDAP search request.

6. The monitoring device of claim 1, wherein the LDAP search result comprises a number of attributes that include the response data.

7. The monitoring device of claim 1, the instructions being further executable to:
   send the LDAP search request to the LDAP search handler to generate a first LDAP search result with an empty dataset or error response; and
   substitute the empty dataset or error response of the first LDAP search result with the response data for the second protocol.

8. The monitoring device of claim 1, wherein the monitoring device comprises a domain controller configured with the LDAP search handler, a search interceptor to intercept the LDAP search request, and second protocol response generator to generate the response data.

9. The monitoring device of claim 1, wherein the LDAP search request is sent for password validation.

10. The monitoring device of claim 1, wherein the LDAP search request is sent for reporting workstation logins.

11. A method by a monitoring device, comprising:
    intercepting a lightweight directory access protocol (LDAP) search request sent to LDAP search handler of a security subsystem, the LDAP search request comprising a query string containing data for a second protocol, wherein the LDAP search handler performs LDAP operations, wherein the query string is for a second protocol operation that is separate from the LDAP operations, and wherein the query string is meaningless to the LDAP search handler;
    generating response data for the second protocol to substitute for a response by the LDAP search handler; and
    sending an LDAP search result to the calling device, the LDAP search result comprising the response data for the second protocol.

12. The method of claim 11, further comprising:
    sending the LDAP search request to the LDAP search handler to generate a first LDAP search result with an empty dataset or error response; and
    substituting the empty dataset or error response of the first LDAP search result with the response data for the second protocol.

13. A calling device, comprising:
    a processor;
    a memory in electronic communication with the processor;
    instructions stored in the memory, the instructions being executable to:
    detect an event;
    generate a lightweight directory access protocol (LDAP) search request with a query string containing data for a second protocol, wherein the LDAP search request is for LDAP operations, wherein the query string is for a second protocol operation that is separate from the LDAP operations, and wherein the query string is meaningless to an LDAP search handler;

send the LDAP search request to a monitoring device; and receive an LDAP search result containing response data for the second protocol that substitutes for a response by the LDAP search handler.

14. The calling device of claim 13, wherein the query string is formatted with a valid LDAP search request format but causes the LDAP search handler to generate an empty dataset or error response.

15. The calling device of claim 13, wherein the query string comprises a command for the monitoring device to perform an operation and a number of key value pairs to be used in the operation.

16. The calling device of claim 13, wherein the query string comprises a filter to indicate that the LDAP search request is a modified LDAP search request.

17. The calling device of claim 13, wherein the LDAP search result comprises a number of attributes that include the response data.

18. The calling device of claim 13, the instructions being further executable to perform an operation in response to the response data.

19. A method by a calling device, comprising:

detecting an event;

generating a lightweight directory access protocol (LDAP) search request with a query string containing data for a second protocol, wherein the LDAP search request is for LDAP operations, wherein the query string is for a second protocol operation that is separate from the LDAP operations, and wherein the query string is meaningless to an LDAP search handler;

sending the LDAP search request to a monitoring device; and receiving an LDAP search result containing response data for the second protocol that substitutes for a response by the LDAP search handler.

20. The method of claim 19, further comprising performing an operation in response to the response data.

* * * * *

UNITED STATES PATENT AND TRADEMARK OFFICE
CERTIFICATE OF CORRECTION

PATENT NO. : 11,310,192 B1
APPLICATION NO. : 16/722388
DATED : April 19, 2022
INVENTOR(S) : Anthony Nicholas Sarra et al.

It is certified that error appears in the above-identified patent and that said Letters Patent is hereby corrected as shown below:

In the Specification

In Column 4, Line 54 please delete ""="" and replace it with -- "*=" --.

In Column 10, Line 9 please delete "=63006F" and replace it with -- *=63006F --.

Signed and Sealed this
Twenty-third Day of August, 2022

Katherine Kelly Vidal
*Director of the United States Patent and Trademark Office*